United States Patent [19]

Kumpfmueller

[11] Patent Number: 4,992,945
[45] Date of Patent: Feb. 12, 1991

[54] METHOD AND APPARATUS FOR DISTINGUISHING SKIDDING WHEELS OF A VEHICLE FROM DRIVE TRAIN VIBRATIONS

[75] Inventor: Hans-Georg Kumpfmueller, Donaustauf, Fed. Rep. of Germany

[73] Assignee: Siemens Aktiengesellschaft, Berlin and Munich, Fed. Rep. of Germany

[21] Appl. No.: 419,123

[22] Filed: Oct. 10, 1989

[30] Foreign Application Priority Data

Oct. 13, 1988 [EP] European Pat. Off. ........ 88117057.5

[51] Int. Cl.$^5$ .............................................. B60T 8/32
[52] U.S. Cl. .......................... 364/426.02; 364/426.03; 180/197; 303/97; 303/103
[58] Field of Search ...................... 364/426.02, 426.01, 364/426.03; 303/92, 109, 97, 103; 180/197

[56] References Cited

U.S. PATENT DOCUMENTS

| | | |
|---|---|---|
| 4,521,856 | 6/1985 | Phelps et al. . |
| 4,701,855 | 10/1987 | Fennel ........................ 364/426.02 |
| 4,760,893 | 8/1988 | Sigl et al. ................... 364/426.02 |
| 4,774,668 | 9/1988 | Matsubara et al. . |
| 4,823,269 | 4/1989 | Fujioka et al. ............. 364/426.03 |
| 4,843,552 | 6/1989 | Inagaki ...................... 364/426.03 |
| 4,844,557 | 7/1989 | Giers ......................... 364/426.02 |
| 4,855,917 | 8/1989 | Sawano et al. ............. 364/426.02 |
| 4,886,123 | 12/1989 | Arnold et al. .............. 364/426.03 |
| 4,942,950 | 7/1990 | Watanabe et al. .......... 364/426.03 |

FOREIGN PATENT DOCUMENTS

| | | |
|---|---|---|
| 0252384 | 1/1988 | European Pat. Off. . |
| 0262602 | 4/1988 | European Pat. Off. . |
| 3729963 | 3/1988 | Fed. Rep. of Germany . |
| 1603459 | 11/1981 | United Kingdom . |
| 2151732 | 7/1985 | United Kingdom . |

*Primary Examiner*—Parshotam S. Lall
*Assistant Examiner*—Tyrone Queen
*Attorney, Agent, or Firm*—Hill, Van Santen, Steadman & Simpson

[57] ABSTRACT

Method and apparatus by which skidding wheels of a vehicle are quickly recognized and distinguished from drive train vibrations. The method uses the difference between values of a comparison parameter (e.g. wheel circumferential distance) of a driven wheel and a similar comparison parameter of a non-driven wheel. The differences are summed over time intervals as soon as a kinetic parameter (e.g. slippage of the driven wheel) exceeds a threshold value. When the sum of the difference values exceeds a maximum value, a control signal is generated that can be used, for example, as an alarm signal for the driver, or as a control signal for changing the drive moment of the wheel, for changing gears, or for driving additional wheels.

12 Claims, 1 Drawing Sheet

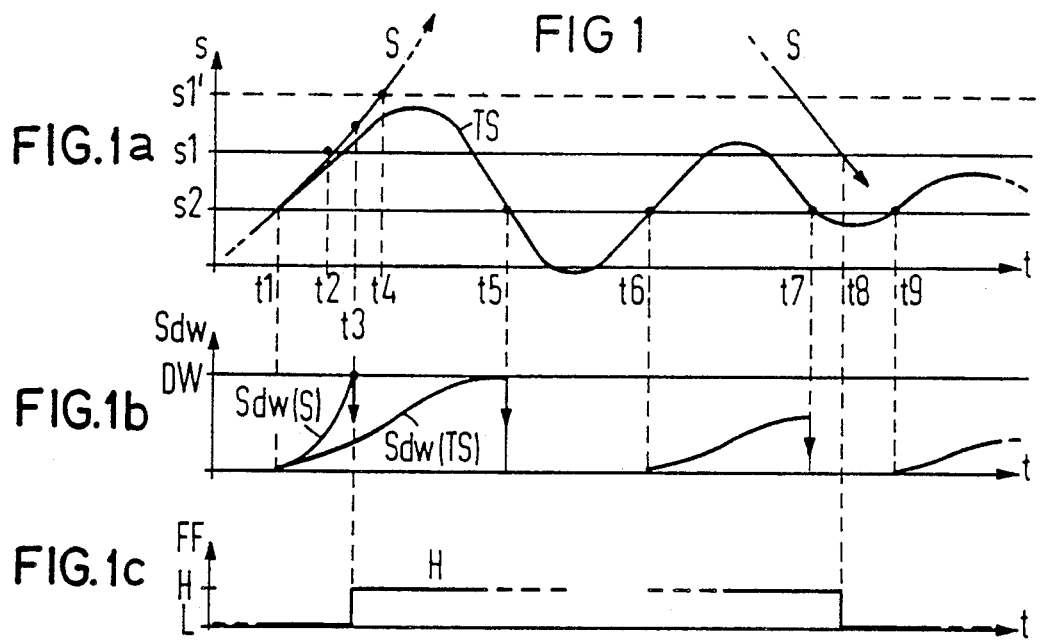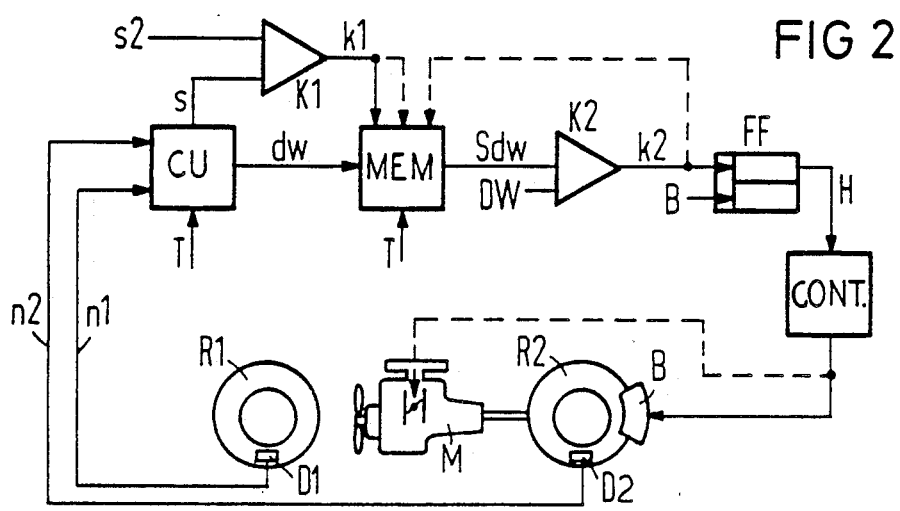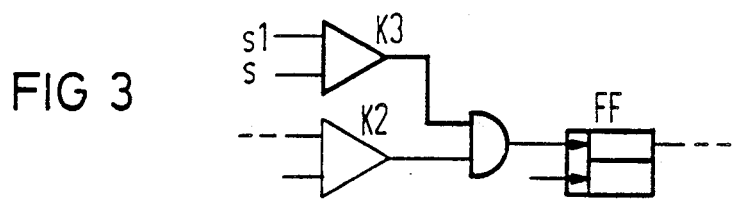

METHOD AND APPARATUS FOR DISTINGUISHING SKIDDING WHEELS OF A VEHICLE FROM DRIVE TRAIN VIBRATIONS

TECHNICAL FIELD

The invention is directed to a method for distinguishing skidding wheels of a vehicle from drive train vibrations, and to an apparatus for the implementation of this method.

BACKGROUND OF THE INVENTION

Methods of skid detection are known wherein the speed or acceleration difference between a driven and a non-driven wheel, with reference to the speed or acceleration of a non-driven wheel, serves as kinetic parameter. When this kinetic parameter exceeds a prescribed threshold, the brake of a skidding wheel or the drive power of the vehicle motor is influenced in a way to prevent the skidding of the driven wheel. In order to be able to recognize the onset of skidding as soon as possible, this threshold should be as low as possible. However, speed differences exceeding such low thresholds can be produced by vibrations in the drive train that occur when changing gears, when vehicle loads shift, or when the vehicle encounters irregularities in the roadway.

Such vibrations in the drive train produce speed differences that do not differ from those of skidding wheels in the first hundred through two hundred milliseconds. The chronological curve of the resulting slippage of the drive wheels is sinusoidal, with frequencies of about 3 through 5 Hertz. Filtering such low-frequency vibrations out is infeasible due to long filter times. Boosting the thresholds, by contrast, delays the recognition of skidding wheels, and thus delays the beginning of corrective action.

SUMMARY OF THE INVENTION

It is therefore an object of the present invention to provide a method that allows the sensitivity of the recognition of skidding wheels to be substantially maintained while distinguishing drive train vibrations from skidding wheels, so that a signal to begin corrective action is generated only in response to skidding wheels, not to drive train vibrations. It is another object of the invention to provide an apparatus for the implementation of this method.

As already mentioned, a speed difference between a driven wheel and the non-driven wheel, with reference to the speed of the driven wheel, generally serves as kinetic parameter. Wheel acceleration can serve in the place of wheel speed.

The present invention uses the circumferential distance that is traversed in a clock interval as a comparison parameter. Alternatively, wheel speed or wheel acceleration can be used in place of the wheel circumferential distance.

The invention is based on the assumption that the drive train of a vehicle (given a dry, non-skid roadway and well-adhering tires) allows a specific, frequency-independent maximal differential rotation of the driven wheels with respect to the non-driven wheels. When the actual (detected) differential rotation exceeds this maximal value, it is interpreted as a skidding of the drive wheels. A control signal generated in response thereto can serve, for example, as an alarm signal for the driver, or as an actuating signal for changing the drive moment of a driven wheel, for changing gears, or for driving additional wheels.

Other objects and advantages of the present invention will become apparent upon reference to the accompanying description when taken in conjunction with the following drawings.

BRIEF DESCRIPTION OF THE DRAWINGS

FIG. 1a is a graph illustrating the slippage curve S given a skidding wheel and the slippage curve TS given a drive train vibration.

FIG. 1b is a graph illustrating the curve of sums Sdw derived from the values represented in FIG. 1a.

FIG. 1c is a graph illustrating the curve of a control signal H.

FIG. 2 is a schematic block circuit diagram of an apparatus for the implementation of the method of the present invention.

FIG. 3 is a schematic block circuit diagram showing an alternative to a portion of FIG. 2.

DETAILED DESCRIPTION OF THE PREFERRED EMBODIMENTS

The diagrams in FIGS. 1a–1c are schematic and are not to scale. FIG. 1a, wherein time is entered on the abscissa and slippage is entered on the ordinate, shows the difference between the slippage curve TS of a drive train vibration, in the form of an attenuated vibration, and the slippage curve S of a skidding wheel (only the start and end of the latter is shown because of its great amplitude). Further, a threshold s1 is shown. Prior systems, when the slippage of the driven wheel exceeds the threshold S1, generate an actuation signal to execute a control measure in order to prevent skidding. Threshold S1 is intersected by the curve S of the skidding wheel at point in time t2, at which, in prior systems, a control event for preventing the skidding of the wheel would begin. As may be seen from FIG. 1a, the slippage threshold s1 is also exceeded by the slippage curve TS of a drive train vibration shortly after time t2. A prior system would thus also initiate a control even there, even though it is neither required nor desired. One could boost the threshold s1 to the value s1' (shown with broken lines) to a level that can no longer be exceeded by slippage due to drive train vibrations; however, a control event intended to prevent the skidding of a wheel could then only begin at point in time t4, which may be too late to actually prevent skidding.

The present invention distinguishes a skidding wheel from a drive train vibration first by setting an initial response threshold s2 that is below the threshold s1. This response threshold s2 is dimensioned such that a control event will not begin until about the time t2, even though the threshold S1 itself is not used, or is not exclusively used, for the engagement of the control. The initial response threshold S2 is exceeded by the increasing slippage values (kinetic parameter) of the driven wheel at point in time t1.

After t1, the difference between the circumferential distances (used as a comparison parameter) traversed in time intervals (by the driven and non-driven wheels of the same side of the vehicle) are continuously sampled and summed-up in clocked fashion. Circumferential distance is defined as that part of the wheel circumference that corresponds to the rotational angle of the wheel covered in a clock interval. For a skidding wheel, this circumferential distance will be greater than that of a non-driven, freely rolling wheel. The differences between the two values sampled for every clock interval are added up. This is shown in FIG. 1b, wherein time is entered on the abscissa, and the sum Sdw of the differences of the circumferential distances is entered on the ordinate.

The chronological curve of the sums of these differences is shown by the curve Sdw(TS) for a drive train vibration and is shown by the curve Sdw(S) for a skidding wheel. A maximum value DW is defined for the sums Sdw such that DW cannot be reached by the sums of differences due to drive train vibration, but is quickly exceeded by the sums of differences due to skidding wheel. Sdw(S) will exceed DW at a relatively early time given a smooth roadway and low traction of the vehicle tires, as is the case at point in time t3. The upward transgression of the maximum value DW by the sum Sdw is thus the criterion for distinguishing skidding wheels from drive train vibrations. A control signal H that is shown in FIG. 1c is generated when the maximum value DW is reached or exceeded. Time is entered on the abscissa in FIG. 1c. Two discrete values H and L, corresponding to the statuses that a digital signal can assume, are entered on the ordinate. The control signal H initiates a control event that is intended to stop the skidding of the wheel.

Monitoring of the slippage curve of the driven wheel is required only until either the maximum value DW of the sum Sdw(S) is reached or exceeded and a control event is initiated, or until the slippage of the wheel below the initial response threshold s2. When one of these two events has occurs, the sum Sdw accumulated up to the event is erased, i.e. reset to value zero. Such resetting is shown in FIG. 1b at points in time t3, t5 and t7 with downwardly directed arrows. When the response threshold s2 is again upwardly exceeded, summation of the differences is again initiated, as shown at points in time t6 and t9.

As shown in FIG. 1c, the control signal H is erased when the sums fall below threshold s1, as shown at point in time t8. The signal is present as long as a control event lasts, and can be used for a variety of purposes, as set forth hereinabove. The control signal can also be erased when the response threshold s2 is fallen below, when some other predetermined value is fallen below, or at a predetermined time after it is triggered.

It may be seen from FIGS. 1a and 1b that, with the present invention, no control events are triggered when the threshold s1 is exceeded due to drive train vibrations TS (between the points in time t6 and t7). On the other hand, skidding of the wheel can be quickly recognized.

As in the above described method, a preferred embodiment of the apparatus embodying the present invention, and shown in FIG. 2, is directed to the monitoring of a single, driven vehicle wheel. A second, similar apparatus is then required for monitoring the other driven wheel, with some parts that can be commonly used. For example, the monitoring system may use a shared apparatus for processing the mean values of the quantities derived from the driven wheels and from the non-driven wheels.

Signals representing the speed n2 of the driven vehicle wheel R2 and the speed n1 of the non-driven vehicle wheel R1 (generated by wheel speed sensors D1 and D2), together with signal T having a constant frequency, are supplied to a calculating unit R. In a known way, this calculating unit R calculates the speed of the wheels, the slippage of the driven wheel, and the differences dw in the circumferential distances of both wheels traversed per clock interval. The calculated slippage s of the driven wheel R2 is supplied to a first comparator K1 and is compared to a value representing the initial response threshold s2 stored therein. When the slippage exceeds the threshold S2, then the first comparator K1 emits an output signal k1. This output signal k1, together with the clock signal T and the differences dw of the circumferential distances calculated in the calculating unit R, are supplied to a summing memory SP. In the summing memory SP, the individual difference values dw are added up as soon as the output signal k1 of the first comparator K1 is generated, and for as long as the signal k1 is present. The content of the memory device SP, the calculated sum Sdw, is supplied to a second comparator K2 in which it is compared to the predetermined maximum value DW. When the stored sum Sdw exceeds the maximum value DW, the second comparator K2 emits an output signal k2 that is supplied to the setting input of a bistable flip-flop FF, for example an RS-flip-flop. A signal at the output of the flip-flop FF forms the control signal H for actuating a control means RE that initiates corrective or preventive action for the purpose of changing the drive moment of the wheel R2 which is tending to skid. The corrective action may be accomplished either via the brake B or via the vehicle motor M, or by some other mechanism intended to prevent skidding of the wheel.

The output signals k1 and k2 of the two comparators K1 and K2 can, as indicated by the broken-line arrows, be supplied to the memory device SP as reset signals and can be used for resetting the sum Sdw stored therein. The output signal k2 can thereby be directly supplied to the memory device SP, and the output signals k1 can be supplied to the memory device SP after inversion. The flip-flop FF can be reset either when the slippage of the driven wheel falls below the threshold s1 (as shown) or after a defined duration of the control signal H itself (as indicated by signal B).

FIG. 3 shows an alternative to the embodiment of FIG. 2. If the control signal H is to be triggered when the sum Sdw exceeds the maximum value DW and the kinetic parameter S simultaneously lies above the threshold s1, then a third comparator K3 may be provided. In the comparator K3, the kinetic parameter S is compared to the threshold s1. When the parameter S exceeds the threshold S1, the comparator K3 emits an output signal that, together with the output signal of the comparator K2, is supplied to the inputs of a logical AND element, whose output signal is then supplied to the flip-flop FF. The elements additionally required are illustrated with thick lines in FIG. 3.

Although the present invention has been described with reference to a specific embodiment, those of skill in the art will recognize that changes may be made thereto without departing from the scope and spirit of the invention as set forth in the appended claims.

I claim:

1. A method for distinguishing skidding wheels of a vehicle from driven train vibrations comprising the following steps:
    determining when a kinetic parameter exceeds a threshold value;
    calculating, in clocked fashion, a set of difference values between a first comparison parameter corresponding to a driven wheel and a second comparison parameter corresponding to a non-driven wheel, when the kinetic parameter is greater than a threshold value;

adding the difference values;

comparing the sum of the calculated difference values to a predetermined maximum value; and triggering a control signal indicating skidding wheels when the sum of the difference values is greater than said predetermined maximum value.

2. A method according to claim 1, comprising the additional step of setting the sum of the calculated difference values to the value zero when said sum exceeds said predetermined maximum value or when the kinetic parameter derived from the wheel speeds falls below a predetermined minimum value.

3. A method according to claim 2, comprising the additional steps of deriving said kinetic parameter from the wheel speeds, and choosing said predetermined minimum value such that it is no greater than said threshold value.

4. A method according to claim 1, comprising the additional step of triggering the control signal only when the sum of the calculated difference values exceeds said predetermined maximum value and said kinetic parameter simultaneously lies above said threshold value.

5. A method according to claim 1, comprising the additional step of erasing said control signal at a predetermined time after it is triggered.

6. A method according to claim 1, comprising the additional step of erasing the control signal upon downward transgression of said threshold value by said difference value.

7. A method according to claim 1, further wherein said comparison parameters comprise the circumferential distance traveled by the respective wheels.

8. A method according to claim 1, further wherein said comparison parameters comprise the respective wheel speeds.

9. A method according to claim 1, further wherein said comparison parameters comprise the acceleration of the respective wheels.

10. A method according to claim 1, further comprising the following steps:

providing a first comparator to compare said kinetic parameters to said response threshold value and emit an output signal when the kinetic parameter exceeds the response threshold value;

providing a calculating unit to calculate said difference values;

providing a memory unit to form the sum of said difference values calculated by said calculating unit in clocked fashion;

providing a second comparator to compare the sum to a predetermined maximum value;

retaining the sum formation in the memory unit for the duration of the output signal of the first comparator, or up to the beginning of an output signal from the second comparator, and subsequently erasing the sum formed in the memory unit; and setting a flip-flop with the output signal of the second comparator and emitting said control signal from said flip-flop, and resetting said flip-flop when the kinetic parameter falls below said threshold (s1) or after a prescribed duration (signal B).

11. A method of generating a control signal in response to skidding wheels of a vehicle, said method comprising the following steps:

sensing a first kinetic parameter in at least one driven wheel of said vehicle;

sensing a second, similar kinetic parameter in at least one non-driven wheel of said vehicle;

generating difference signals representing the difference between said first and second parameters;

sampling the value of said difference signals;

summing the value of said difference signals over predetermined time intervals when said difference signals exceed a first predetermined threshold value; and generating a control signal indicating skidding wheels when the value of the sum of said difference signals exceeds a second predetermined threshold value.

12. An apparatus of generating a control signal in response to skidding wheels of a vehicle, said apparatus comprising the following:

means for sensing a first kinetic parameter in at least one driven wheel of said vehicle;

means for sensing a second, similar kinetic parameter in at least one non-driven wheel of said vehicle;

means for generating difference signals representing the difference between said first and second parameters;

means for sampling the value of said difference signals;

means for summing the value of said difference signals over predetermined time intervals when said difference signals exceed a first predetermined threshold value; and means for generating a control signal indicating skidding wheels when the value of the sum of said difference signals exceeds a second predetermined threshold value.

* * * * *